United States Patent Office 2,742,468
Patented Apr. 17, 1956

2,742,468

SUBSTITUTED TETRAHYDRO PTERIDINES AND METHOD OF PREPARING THE SAME

John A. Brockman, Jr., Pearl River, N. Y., and Barbara Roth, Arlington Heights, Ill., assignors to American Cyanamid Company, New York, N. Y., a corporation of Maine No Drawing. Application April 14, 1952,
Serial No. 282,276

16 Claims. (Cl. 260—251.5)

This invention relates to new substituted tetrahydro pteridines having biological activity and to processes of preparing the same.

In 1948 Sauberlich and Baumann, Journal of Biological Chemistry, 176, page 165 (1948), recognized the existence of a substance that stimulated the growth in a synthetic medium of *Leuconostoc citrovorum*. This unknown substance was found to be present in commercial liver extracts and also in liver and a wide variety of natural materials. It has subsequently been found that the unknown substance can replace folic acid requirements in micro-organisms and chicks. It has further been found that the growth factor will reverse the action of pteroylglutamic acid antagonists and, surprisingly, will reverse the toxic effects of 4-aminopteroylglutamic acid or aminopterin (N-[4-{[(2,4-diamino-6-pyrimido[4,5-b]pyrazyl)-methyl]-amino}benzoyl]glutamic acid) in mice and bacteria under conditions in which pteroylglutamic acid is ineffective.

In our copending application, Serial No. 191,722, filed October 23, 1950, now abandoned, we described certain substituted pteridines having in the 4-position an amino radical which had physiological activity. We have now found that other substituted pteridines hereinafter described having an amino group in the 4-position have activity in inhibiting growth of certain bacteria and therefore may find use in medicine. These compounds are described hereinafter in the present application, which is a continuation-in-part of said application, Serial No. 191,722.

The new compounds of the present invention may be prepared by reduction of the formyl derivatives of certain known compounds which have been previously prepared, some of which have been described in the literature, and subsequent treatment under neutral or alkaline conditions. The starting materials that may be used in the process of the present invention to prepare the new compounds may be represented by the following structural formula:

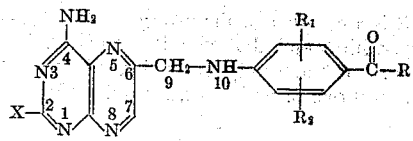

in which X is amino, a monoalkylamino or a dialkylamino radical, R is a hydroxyl group or a radical of an amino acid and $R_1$ and $R_2$ are hydrogen or halogen radicals. The compounds described above are formylated by reacting with formic acid, an alkyl formimino ether or other compounds capable of introducing the formyl radical into the $N^{10}$-position of the above compounds.

In the above formula R is described as a hydroxyl group or a radical of an amino acid. This amino acid is preferably glutamic acid or a peptide of glutamic acid such as glutamylglutamic acid, glutamylglutamylglutamic acid, hexa-glutamylglutamic acid, glycyl glutamic acid or the like. The amino acid radical may, however, be of another amino acid, for example, aspartic acid, glycine, alanine, dl-isoleucine, dl-valine, serine, or the like. Since the amino acids contain carboxylic acid groups, obviously salts of these compounds may also be used in the process if desired.

The compounds of the present invention can also be prepared by reduction of the 2-substituted-4-aminopteridine followed by formylation.

The exact structure of the new compounds produced by the reduction of the above formyl compounds and subsequent treatment under alkaline conditions has not been definitely determined as yet in view of their complex nature. It is believed, however, that they may be represented by the following formulae:

(I)
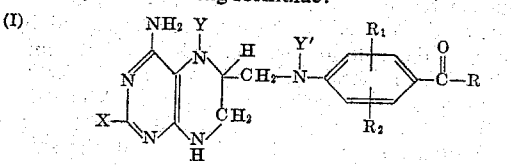

in which Y and Y' are hydrogen or a formyl radical, at least one of which is a formyl radical, and after treatment under alkaline conditions by the following formula:

(II)
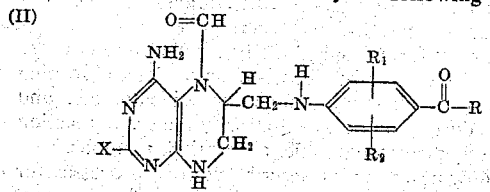

In the above structural formulae X, R, $R_1$ and $R_2$ are as defined above. It will also be understood that the above may exist in tautomeric forms, depending upon the conditions in which they are present.

The reduction of the formyl compound by which the new product of the present invention are prepared may be conducted either with or without the aid of catalysts. When using a catalytic reduction a wide variety of solvents may be used in the process including formic acid, alcohols, glycol, acetic acid and others, depending upon the nature of the catalytic agent. The presence of small amounts of water is not objectionable. The temperature of the reduction may occur over a wide range of temperatures from about 0° C. to about 150° C.

Many different reduction catalysts may be employed in the process such as platinum black, palladium on charcoal, Raney nickel, and others hereinafter described.

In general, the reaction occurs quite rapidly and appreciable yields of the tetrahydro pteridine can be obtained in as little time as ten minutes at room temperature using, for example, platinum in formic acid. The reduction is usually complete within a period of 30 minutes to about 2 hours.

In the process of the present invention the tetrahydro derivatives of the 2-substituted-4-amino-$N^{10}$-formylpteroic acid or amino acid amides thereof or their tautomeric ring forms and $N^5$, $N^{10}$-diformyl 2-substituted-4-aminopteroic acid or amino acid amides thereof, prepared as described above, are treated with alkaline agents in an essentially aqueous medium at a pH of 7 to about pH 14. Alkaline agents such as alkali metal hydroxides, carbonates, bicarbonates and phosphates and the alkaline earth metal hydroxides and quaternary ammonium bases are useful and operable to produce the desired range. The use of an aqueous medium is preferable although mixtures of water and other water miscible solvent can be used such as alcoholic mixtures. The reaction occurs slowly at room temperature on long standing. It can be made to take place in a shorter period of time such as 30 minutes to 2 or 3 hours by heating at a temperature of 80° C. to 100° C.

The generally preferred procedure of preparing the new compounds of the present invention is as follows: The 4-amino substituted pteridines such as described hereinbefore are first formylated in 90–100% formic acid at 0°–100° C. The formyl compounds thus prepared may be isolated if desired and the reduction completed in a different solvent. However, it is generally more convenient to continue the reduction in the same solution by adding the catalyst to the solution after which hydrogen may be passed into the reaction mixture with shaking or stirring. In some cases it may be advantageous to activate the catalyst with hydrogen before mixing with the formylated substituted pteridine, although this procedure is not necessary. The pressure of hydrogen in the reaction vessel may be from 1 to 100 atmospheres or more but under ordinary conditions 2 or 3 atmospheres pressure are sufficient to obtain a good yield. After the reduction, the catalyst is removed by filtration and the solution is buffered in an aqueous alkaline medium, preferably at a pH of 7 to 14 such as an aqueous solution of sodium bicarbonate. When desirable, to remove the excess formic acid from the reduction solution after removal of the catalyst, the solution can be poured into ether and the insoluble product, the $N^{10}$-formyl derivative, isolated by filtration, or the solvent may be removed by distillation and the residue recovered; and subsequently treated under alkaline conditions to yield the $N^5$-formyl derivatives.

The reduced formyl substituted pteridine, prepared as described above, may be absorbed on various absorbing agents such as charcoal, magnesium silicate, etc. and these procedures may be used to purify the crude reaction products by chromatographic absorption methods.

The following examples describe various processes for obtaining the biologically active substances of the present invention by the reduction of certain formyl substituted pteridines. All parts are by weight unless otherwise indicated.

*Example 1*

Two parts of 4-aminopteroylglutamic acid of 73% purity are heated for one hour on the steam bath in 40 parts of 98–100% formic acid, and the solution is reduced for two hours in the presence of 0.50 part of platinum oxide catalyst at 35 lbs. hydrogen pressure. The platinum is filtered off and the solution poured into sodium bicarbonate solution. The product shows growth inhibition activity against certain bacteria.

*Example 2*

The process of Example 1 is repeated with the exception that the 4-aminopteroylglutamic acid is stirred for two hours in 98–100% formic acid at 20°–25° C. The resulting solution, upon reduction and isolation of the product as described in Example 1, results in a product with similar growth inhibition activity against certain bacteria.

*Example 3*

0.5 part of 2-dimethylamino-4-aminopteroylglutamic acid are dissolved in 20 parts of 98–100% formic acid and heated one hour on the steam bath. After cooling to room temperature, 0.10 part of platinum oxide catalyst is added and the mixture is reduced at 35 lbs. hydrogen pressure for two hours. The platinum is filtered off and the solution poured into 300 parts of water containing an excess of sodium bicarbonate. The solution is clarified and adjusted to pH 4, followed by the addition of 10 parts of activated charcoal. After stirring for one-half hour at room temperature, the mixture is filtered, and the charcoal cake extracted with an ammonia-ethanol mixture. This is then distilled to dryness and the residue triturated with an ethanol-ether mixture. A dull yellow solid ammonium salt of tetrahydro 2-dimethylamino-4-amino-5-formylpteroylglutamic acid separates, which is then filtered off and dried under reduced pressure and weighs 0.15 part. It possesses growth inhibiting activity.

*Example 4*

One part of 3',5'-dichloro-4-aminopteroylglutamic acid is dissolved in 20 parts of 98–100% formic acid and heated on the steam bath 45 minutes, giving a clear yellow solution. After cooling to room temperature, 0.20 part of platinum oxide catalyst is added and the mixture is reduced at 35 lbs. hydrogen pressure for one and one-half hours. The platinum is filtered off and the solution poured into 300 parts of water containing an excess of sodium bicarbonate. It is then adjusted to pH 4, 10 parts of activated charcoal added and the mixture stirred for one-half hour. The activated charcoal is then filtered off and extracted with an ammonia-ethanol mixture. The resultant solution is distilled under reduced pressure to dryness and the residue taken up in 10 parts of water, yielding a clear solution. This is adjusted to pH 7 and a concentrated solution containing 0.4 part of barium chloride added, followed by 40 parts of ethanol. A white barium salt of tetrahydro 3',5'-dichloro-4-amino-5-formylpteroylglutamic acid is precipitated; dry weight, 0.51 part. It inhibits the growth of certain bacteria.

*Example 5*

This reaction is carried out in the same manner as described in Example 4. From one part of 4-aminopteroylaminomalonic acid, 0.57 part of the yellow barium pteroylaminomalonic salt of tetrahydro-4-amino-5-formylpteroylaminomalonic acid is obtained. It possesses growth inhibiting action against bacteria.

*Example 6*

This reaction is carried out in the same manner as described in Example 4. From one part of 4-aminopteroyl-dl-isoleucine there is obtained 0.17 part of the yellow barium salt of tetrahydro-4-amino-5-formylpteroyl-dl-isoleucine. It possesses growth inhibitory action.

*Example 7*

This reaction is carried out in the same manner as described in Example 4. From one part of 4-aminopteroyl-dl-valine there is obtained 0.35 part of the yellow barium salt of tetrahydro-4-amino-5-formylpteroyl-dl-valine. It possesses growth inhibitory action.

We claim:

1. Compounds of the group consisting of those having the structure:

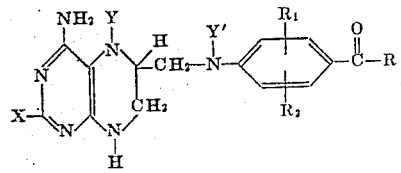

in which X is a member of the group consisting of amino, mono-alkyl-amino and dialkylamino radicals, Y and Y' are members of the group consisting of hydrogen and formyl, at least one of which is a formyl radical, $$-\overset{O}{\underset{\|}{C}}-R$$

is a member of the group consisting of carboxylic acid, carbonylaspartic acid, carbonylglutamic acid, carbonylglutamylglutamic acid, carbonylglutamylglutamylglutamic acid, carbonylaminomalonic acid, carbonylvaline and carbonylisoleucine and $R_1$ and $R_2$ are members of the group consisting of hydrogen and chlorine radicals, and therapeutically useful cationic salts thereof.

2. Tetrahydro-2-dialkylamino-4-amino-5-formylpteroylglutamic acids.

3. Tetrahydro-4-amino-5-formylpteroylglutamic acid.

4. Tetrahydro-2-dimethylamino - 4 - amino - 5 - formylpteroylglutamic acid.

5. Tetrahydro-3',5'-dichloro-4-amino-5-formylpteroylglutamic acid.

6. Tetrahydro-4-amino-5-formylpteroylaminomalonic acid.

7. Tetrahydro-4-amino-5-formylpteroyl-dl-isoleucine.

8. A process which comprises subjecting compounds of the general formula:

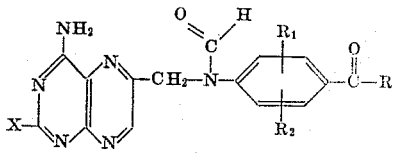

in which X is a member of the group consisting of amino, mono-alkyl-amino and dialkylamino radicals,

is a member of the group consisting of carboxylic acid, carbonylaspartic acid, carbonylglutamic acid, carbonylglutamylglutamic acid, carbonylglutamylglutamylglutamic acid, carbonylaminomalonic acid, carbonylvaline and carbonylisoleucine and $R_1$ and $R_2$ are members of the group consisting of hydrogen and chlorine radicals, to the action of hydrogen until two moles of hydrogen are absorbed, treating said reaction product under alkaline conditions and recovering therefrom a compound having the formula:

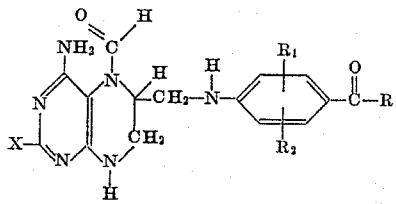

9. A process in accordance with claim 8 in which said compounds are hydrogenated with platinum and hydrogen until two moles of hydrogen are absorbed.

10. A process which comprises subjecting 4-amino-10-formylpteroylglutamic acid to the action of hydrogen and a metal catalyst until two moles of hydrogen are absorbed, subsequently treating the reaction product under alkaline conditions and recovering tetrahydro-4-amino-5-formylpteroylglutamic acid therefrom.

11. A process which comprises subjecting a 2-dialkylamino-4-amino-10-formylpteroylglutamic acid to the action of hydrogen until two moles of hydrogen are absorbed and subsequently treating the reaction product under alkaline conditions and recovering a tetrahydro-2-dialkylamino-4-amino-5-formylpteroylglutamic acid therefrom.

12. A process which comprises the step of hydrogenating 4-amino-10-formylpteroylglutamic acid by the action of platinum and hydrogen until two moles of hydrogen are absorbed, and recovering tetrahydro-4-amino-10-formylpteroylglutamic acid therefrom.

13. A process which comprises hydrogenating 2-dimethylamino-4-amino-10-formylpteroylglutamic acid by the action of platinum and hydrogen until two moles of hydrogen are absorbed, treating the reaction product under alkaline conditions and recovering tetrahydro-2-dimethylamino-4-amino-5-formylpteroylglutamic acid therefrom.

14. A process which comprises hydrogenating 3',5'-dichloro-4-amino-10-formylpteroylglutamic acid by the action of platinum and hydrogen, until two moles of hydrogen are absorbed, subsequently treating the reaction product under alkaline conditions and recovering tetrahydro-3',5-dichloro-4-amino-5-formylpteroylglutamic acid therefrom.

15. A process which comprises the step of hydrogenating 4-amino-10-formylpteroylaminomalonic acid by the action of platinum and hydrogen until two moles of hydrogen are absorbed and recovering tetrahydro-4-amino-10-formylpteroylaminomalonic acid therefrom.

16. A process which comprises the step of hydrogenating 4-amino-10-formylpteroyl-dl-isoleucine by the action of platinum and hydrogen until two moles of hydrogen are absorbed and recovering tetrahydro-4-amino-10-formylpteroyl-dl-isoleucine therefrom.

No references cited.